Feb. 17, 1931. T. MUNRO 1,793,122
SPRING COVER
Filed Sept. 8, 1928 2 Sheets-Sheet 1
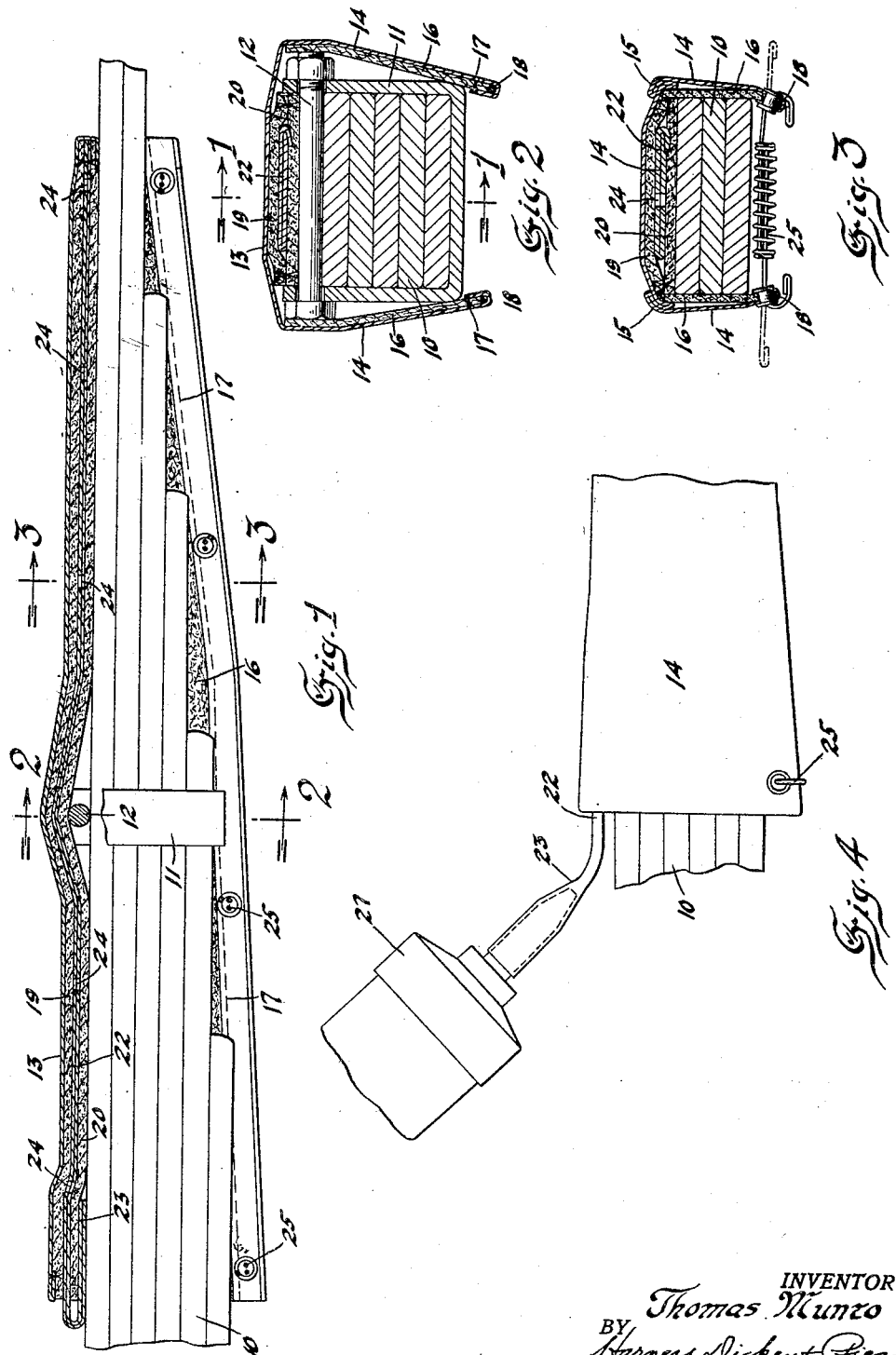
INVENTOR
Thomas Munro
BY Harness, Dickey & Pierce
ATTORNEY

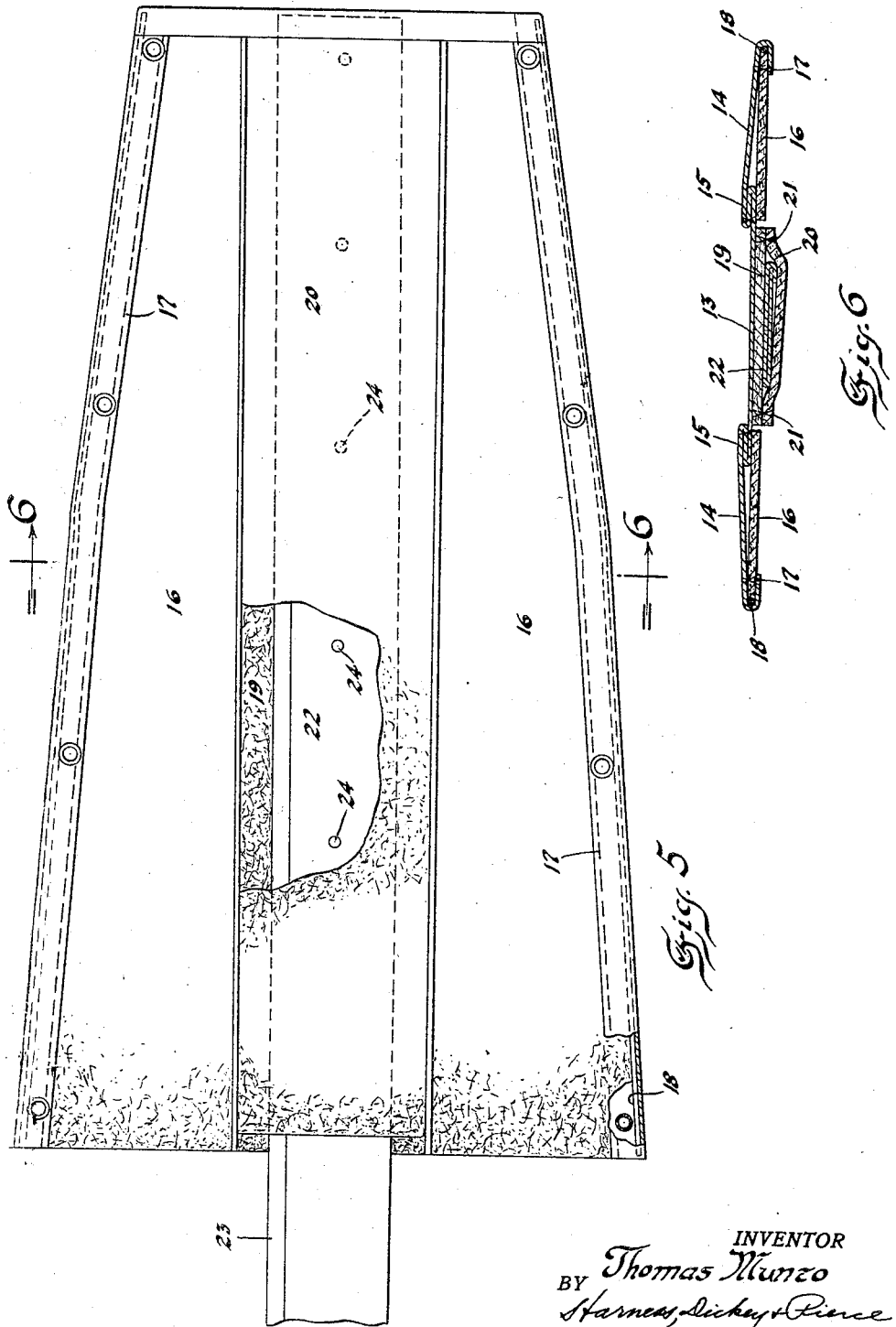

Patented Feb. 17, 1931

1,793,122

UNITED STATES PATENT OFFICE

THOMAS MUNRO, OF PHILADELPHIA, PENNSYLVANIA

SPRING COVER

Application filed September 8, 1928. Serial No. 304,671.

This invention relates to covers for the leaf springs of motor vehicles and particularly to lubricating means for use in connection therewith, the principal object being to provide a new and novel means for introducing lubricant into such spring covers.

Another object is to provide a flexible tube in combination with the spring cover for a motor vehicle so arranged in respect thereto as to be capable of being employed for introducing lubricant into the interior of the cover.

Another object is to provide a spring cover for the springs of motor vehicles comprising a cover member provided with a lining of lubricant absorbing material, a flexible tube being enclosed in such material and formed to permit the introduction of lubricant thereinto, the tube being provided with openings therein for feeding the lubricant therefrom into the absorbing material at a plurality of points therein.

Another object is to provide a flexible tube in connection with the lubricant absorbing material of a spring cover and so arranged in respect thereto that when lubricant is introduced into the tube it will be caused to completely fill the same before it is forced out of the tube and into the absorbing material.

A further object is to provide a spring cover provided with a lining of lubricant absorbing material in which is positioned a fabric tube, one end of which may be projected outwardly thereof, the tube being provided with a plurality of openings therein through which lubricant introduced into the tube may escape into the lubricant absorbing material.

The above being among the objects of the present invention the same consists in certain features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views,—

Fig. 1 is a fragmentary side view of a leaf spring for a motor vehicle provided with a spring cover constructed in accordance with the present invention, the spring cover being broken away as on the line 1—1 of Fig. 2.

Fig. 2 is a sectional view taken on the line 2—2 of Fig. 1.

Fig. 3 is a sectional view taken on the line 3—3 of Fig. 1.

Fig. 4 is a fragmentary view illustrating the manner in which lubricant is introduced into the spring cover.

Fig. 5 is a plan view of the inside surface of the spring cover when flattened out, certain portions thereof being broken away to better illustrate the construction.

Fig. 6 is a sectional view taken on the line 6—6 of Fig. 5.

The present invention is an improvement on the construction shown and claimed in my Letters Patent of United States #1,667,753, issued on the first day of May, 1928. In that construction I provided a mass of lubricant absorbing material on the inside of the spring cover which was adapted to overlie the top surface of the spring. This mass of material was split intermediate its upper and lower surfaces and an opening was provided in the upper surface of the spring cover which extended to the line of split of the lubricant absorbing material for the purpose of introducing lubricant into the absorbing material. This previous construction, while entirely practical and serving the purpose designed in a satisfactory manner, has not been as efficient as I desired it to be in that there was no positive assurance that lubricant introduced through the opening provided for the same would be evenly distributed over the entire length of the cover. As a means for overcoming the difficulties in that design I have provided the construction shown in the present case.

Another disadvantage of my previous construction, above described, is that the opening for the lubricant being readily accessible, the owners of vehicles equipped with the same invariably attempt to lubricate the covers themselves with the result that various grades of lubricant, many of which are unsatisfactory for the work to be performed, are forced into the cover. By the use of the present invention, although the owner may lubricate the covers himself, inasmuch as the means for introducing the lubricant into the covers will normally be concealed, it will usually cause him to take his automobile to a service station to have the covers lubricated, where the right grade of lubricant will be assured.

Referring to the accompanying drawings, it will be seen that many features of the cover shown are the same as that shown in my previous patent, above referred to. The spring 10 is a conventional type of leaf spring employed in connection with motor vehicles and is provided with the usual spring clip 11 secured in place by the cross bolt 12. The spring cover shown in plan in Fig. 5 in flattened position and in section in Fig. 6 comprises an outer fabric portion, preferably made of rubberized or other fabric impervious to lubricant and is formed to provide a central portion 13 adapted to overlie the top surface of the spring 10 and side portions 14 adapted to overlie the sides of the spring 10. The portions 13 and 14 are, preferably, formed of a single piece of fabric which is bent back and forth upon itself along the line of junction of the portions 13 and 14, as at 15, and such bent portions are sewed together throughout their length except in the immediate neighborhood of the spring clip 11, the purpose being that the overlapped portions may pull apart over the spring clip when the cover is applied to the spring and thus form a pocket for the reception of the projecting upper ends of the clip and the corresponding bolt 12. The side portions 14 are each lined with a strip of lubricant absorbing material 16, such as felt or equivalent material, and are held in place by turning over the marginal edge of the side portion 14 over the outer edge of the strip 16 and sewing them together as at 17, a spring wire 18 preferably being inserted in the bent over margin of the portions 14, as in my previous patent, above referred to. On the under surface of the center portion 13 is positioned two layers of lubricant absorbing material 19 and 20, which are sewed together along their edges, as at 21, and preferably are sewed to the cover portion 13 only at their ends. Positioned between the layers 19 and 20 and extending from one end of the cover to the opposite end thereof is a member 22, which is preferably formed of a fabric bent over on itself and sewed so as to simulate a flattened tube. This tube is sewed to the cover portion at one end and is free at its opposite end except for its being confined between the layers 19 and 20 as mentioned, and such free end projects a material amount, as at 23, out past the corresponding end of the cover. The tube 22 is provided along its length with a plurality of openings 24 therein which may be easily formed by simply punching them out of the fabric. It is obvious, of course, that it is immaterial which end of the cover the end 23 projects from.

The cover is applied to the spring 10 and may be secured thereto by spring fastening members 25 in precisely the same manner as described in my previous patent, above referred to, and as illustrated in Figs. 1 and 3. During normal operating conditions when the cover is applied to the spring the extended end 23 is bent under the lower layer 20 of the felt as indicated in Fig. 1 in order to conceal it and to prevent its contact with dirt and dust. When it is desired to lubricate the cover, that spring member 25 nearest the end of the cover where the end 23 is located is disengaged from the cover so as to permit the top portion 13 at such end to be lifted sufficiently to permit the end 23 to be withdrawn from beneath the cover. The spout of a grease gun 27, or other suitable means, is then inserted in the end 23 and lubricant is then forced into the tube 22. During the application of lubricant to the tube 22 as thus described, the following action takes place. The lubricant tends to swell the tube 22 and thus form it into a more perfect tubular shape as the lubricant travels from the end 23 toward the opposite end. In swelling the tube 22 in this manner the flattened sides of the tube are pressed out against the layers 19 and 20 which thereby act to close the openings 24 until the lubricant has completely filled the tube 22 from the open end thereof to the opposite end thereof. As soon as this occurs an increase of pressure upon the lubricant in the tube will force it out of the various openings 24 against the pressure of the layers 19 and 20 and distribute it evenly to the layers 19 and 20 over their length instead of at a single point as in my previous construction. It will be obvious that as many openings 24 may be provided as is necessary to obtain the desired uniform distribution of the lubricant to the layers 19 and 20 over the length thereof. After sufficient lubricant has been introduced into the tube 22 the end 23 thereof is again bent under and inserted under the corresponding end of the cover as illustrated in Fig. 1 and the corresponding spring member 25 is replaced. The lubricant which has been introduced between the layers 19 and 20 will, of course, seep out and be carried down the side strip 16 into contact with the sides of spring 10 where it will work its way in between the various leaves thereof.

While I have shown the tube 22 as being made up of a strip of fabric described as being impervious to the passage of lubricant through it independently of the opening 24, it will be apparent that the particular construction of the material from which the tube is made may be varied between widely different limits and will function satisfactorily regardless of the material from which it is made so long as it is sufficiently flexible to bend in passing over the spring clip 11 and may be bent under at the end as described. It may be pointed out here, and as illustrated in Fig. 2, that the upwardly projecting ends of spring clip 11 provide means whereby the cover is prevented from restricting expansion of the tube 22 over the bolt 12 to an extent to shut off the flow of lubricant through the tube 22 at this point. Furthermore, although I have shown the tube 22 enveloped in the layers 19 and 20 in connection with a spring cover of a particular construction, it will be apparent that its application is not limited to a cover of the specific construction shown, but may be likewise applied to any other type of spring cover.

These and other formal changes may be made in the specific embodiment of the invention described without departing from the spirit or substance of the broad invention, the scope of which is commensurate with the appended claims.

What I claim is:

1. In combination, a spring cover comprising an outer member of lubricant impervious fabric and a lining of lubricant absorbing material, and a tube of lubricant impervious fabric lying within and projecting from said material, said tube being provided with a plurality of openings therein normally closed by said material.

2. In a spring cover, in combination, an outer sheet of lubricant impervious material provided with a lining of lubricant absorbing material, a flexible tube of lubricant impervious fabric secured at one end adjacent one end of said cover and projecting past the other end thereof, and means for introducing lubricant into said tube, said tube being provided with openings for discharging lubricant therefrom onto said lubricant absorbing material.

3. A spring cover comprising an outer sheet of lubricant impervious material and a lining of lubricant absorbing material, a strip of lubricant impervious fabric formed to simulate a tube imbedded in said lubricant absorbing material and extending a material distance through the same, means for introducing lubricant into said fabric tube, and means permitting the escape of said lubricant from said tube to said lubricant absorbing material.

4. In a spring cover, an exterior member of lubricant impervious material and a lining of lubricant absorbing material, a flexible tube of lubricant impervious fabric within said cover provided with a plurality of openings therein, said openings being normally closed by said lubricant absorbing material, and means for introducing lubricant into said tube.

5. In a spring cover, an outer member of lubricant impervious material, two superposed strips of lubricant absorbing material extending from end to end of said outer member within the same, and a perforated flexible tube of lubricant impervious fabric enclosed between said strips and secured thereto at one end only.

6. In combination with a leaf spring of a motor vehicle, a cover for said spring comprising a sheet of lubricant impervious material enclosing the top and sides of said spring, said sheet being lined with a lubricant absorbing material, a lubricant impervious fabric tube within said cover extending from end to end thereof and provided with openings for the escape of lubricant therefrom to said lubricant absorbing material, and said tube projecting past one end of said cover to facilitate the application of lubricant to the interior of the same, said projecting end adapted to be bent under said cover and concealed thereby when not in active use.

7. In combination with a spring cover provided with a lubricant absorbing lining, a normally flat tube of flexible fabric impervious to lubricant enclosed in said lining, one end of said tube being closed and the other end thereof being open for the introduction of lubricant into the same, and said tube being provided with a plurality of openings therein for the escape of lubricant to said lining.

8. In a spring cover, in combination, an outer member of lubricant impervious material, two superposed strips of lubricant absorbing material extending from end to end of said outer member within the same, a flexible tube enclosed between said strips and an extended end on said tube, said extended end being normally reversely bent upon said tube and being concealed by said cover, said extended end being withdrawable from said cover for the purpose of introducing lubricant into the same.

THOMAS MUNRO.